May 22, 1928.  1,670,355
L. B. HARRIS
INTERNAL COMBUSTION ENGINE
Filed March 6, 1926   7 Sheets-Sheet 1
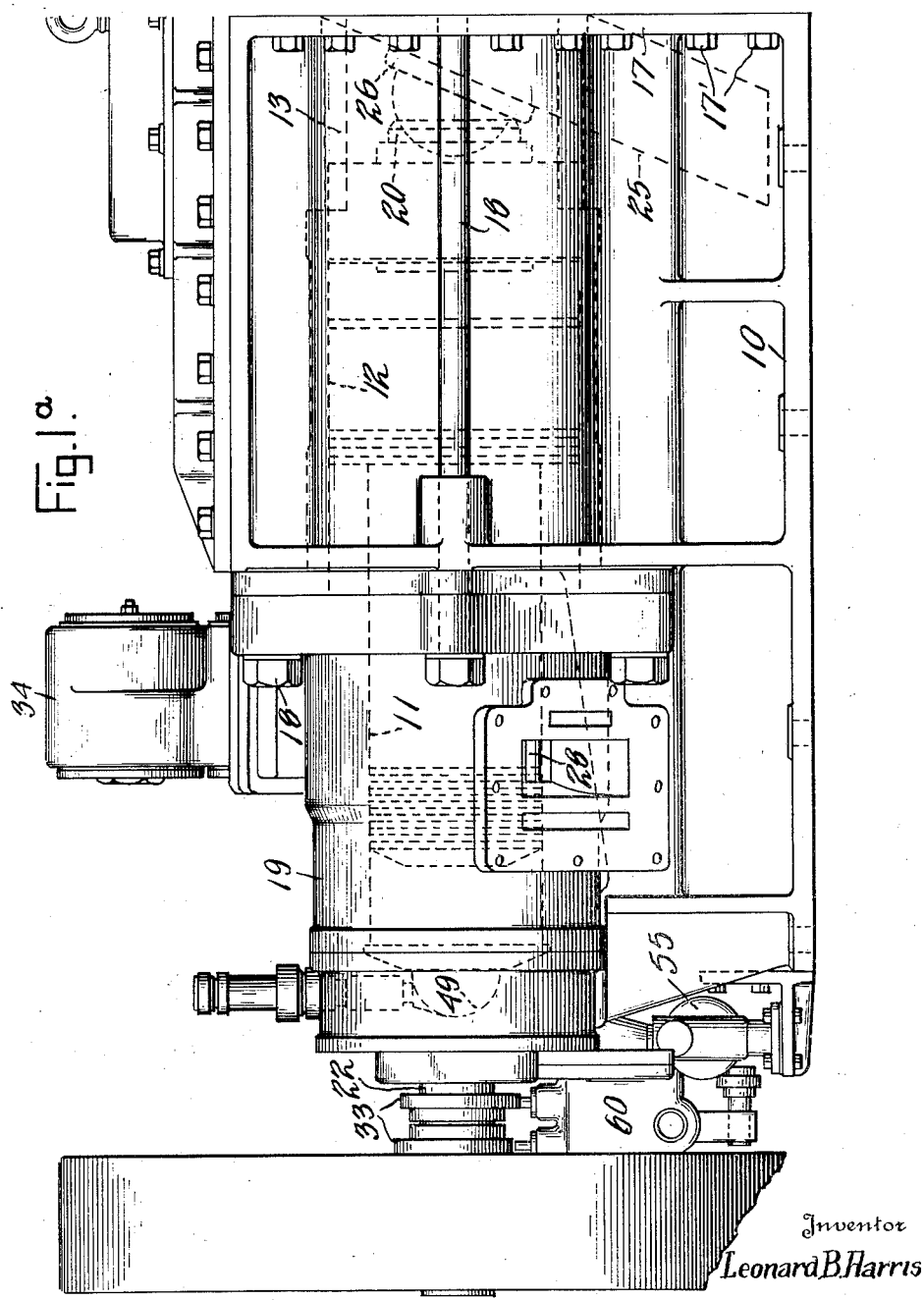
Inventor
Leonard B. Harris
By [signature]
Attorney

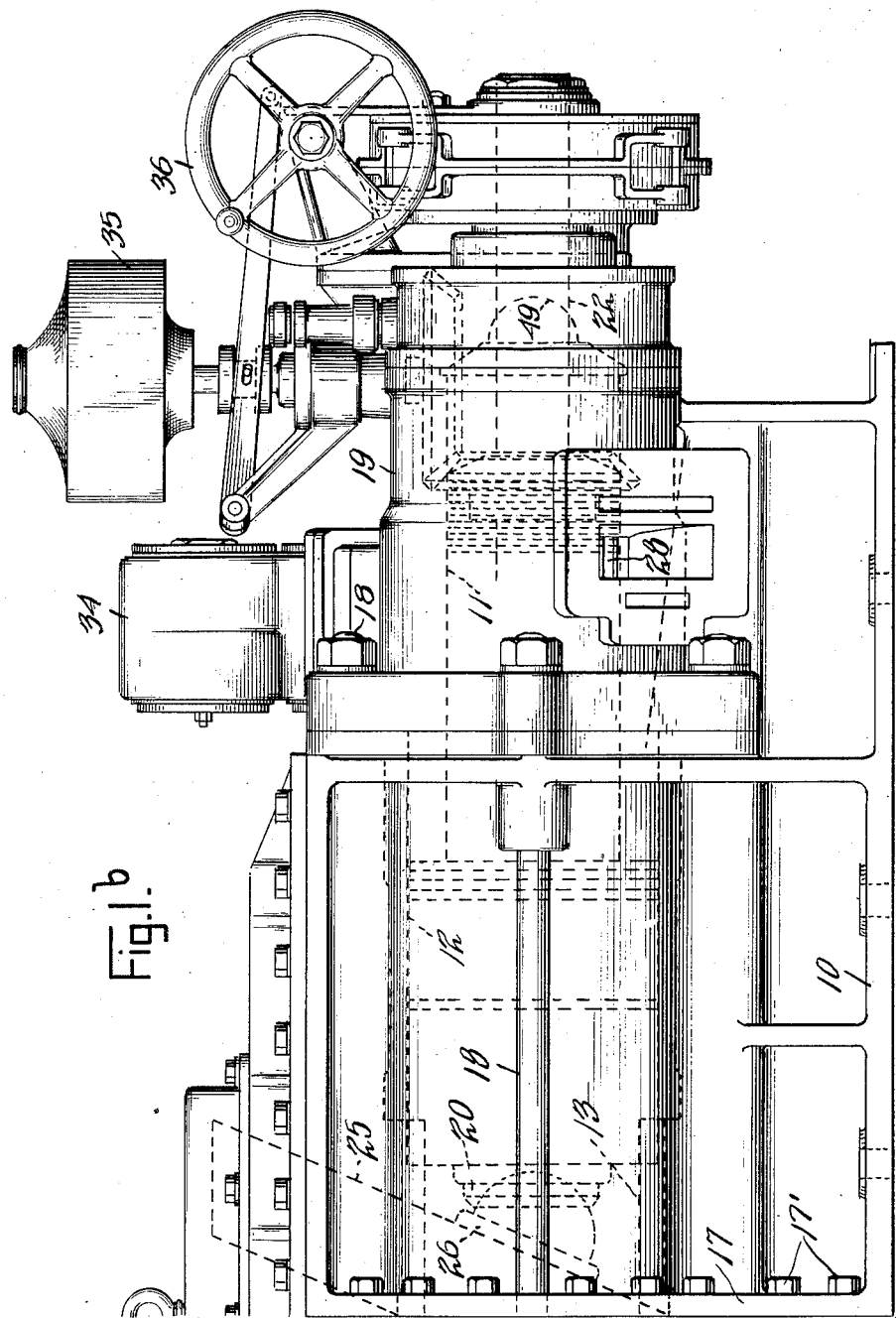

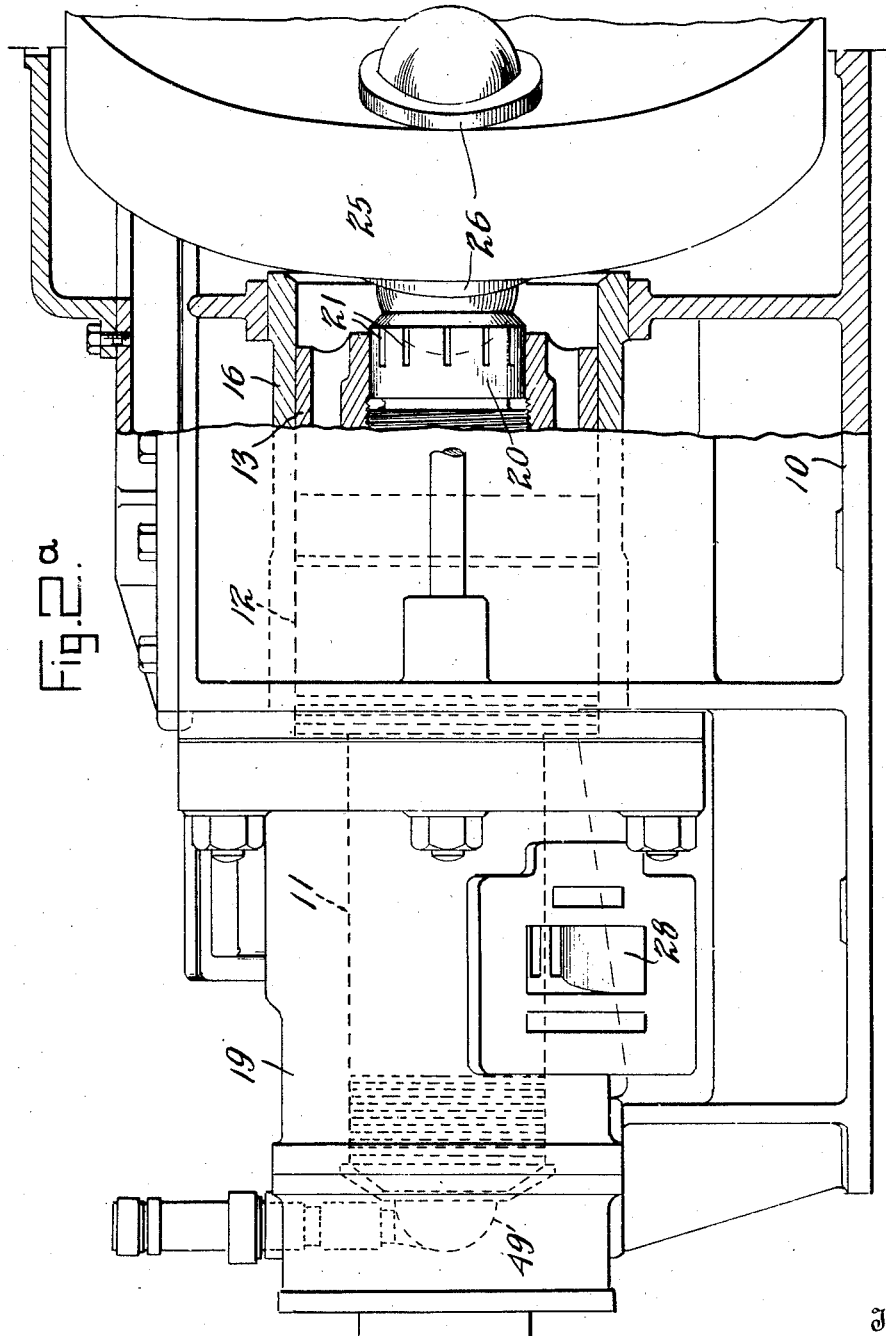

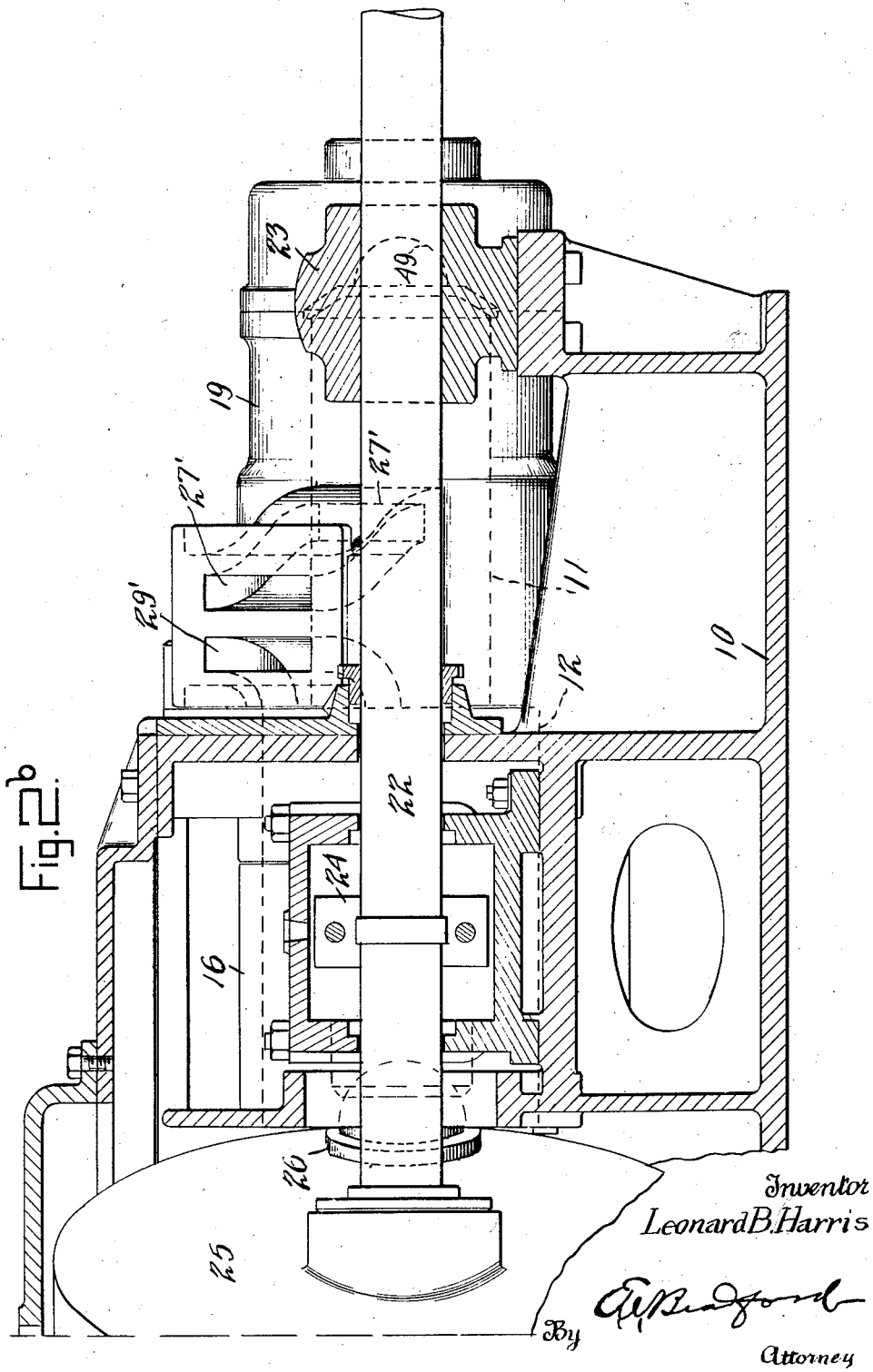

May 22, 1928. 1,670,355
L. B. HARRIS
INTERNAL COMBUSTION ENGINE
Filed March 6, 1926 7 Sheets-Sheet 5
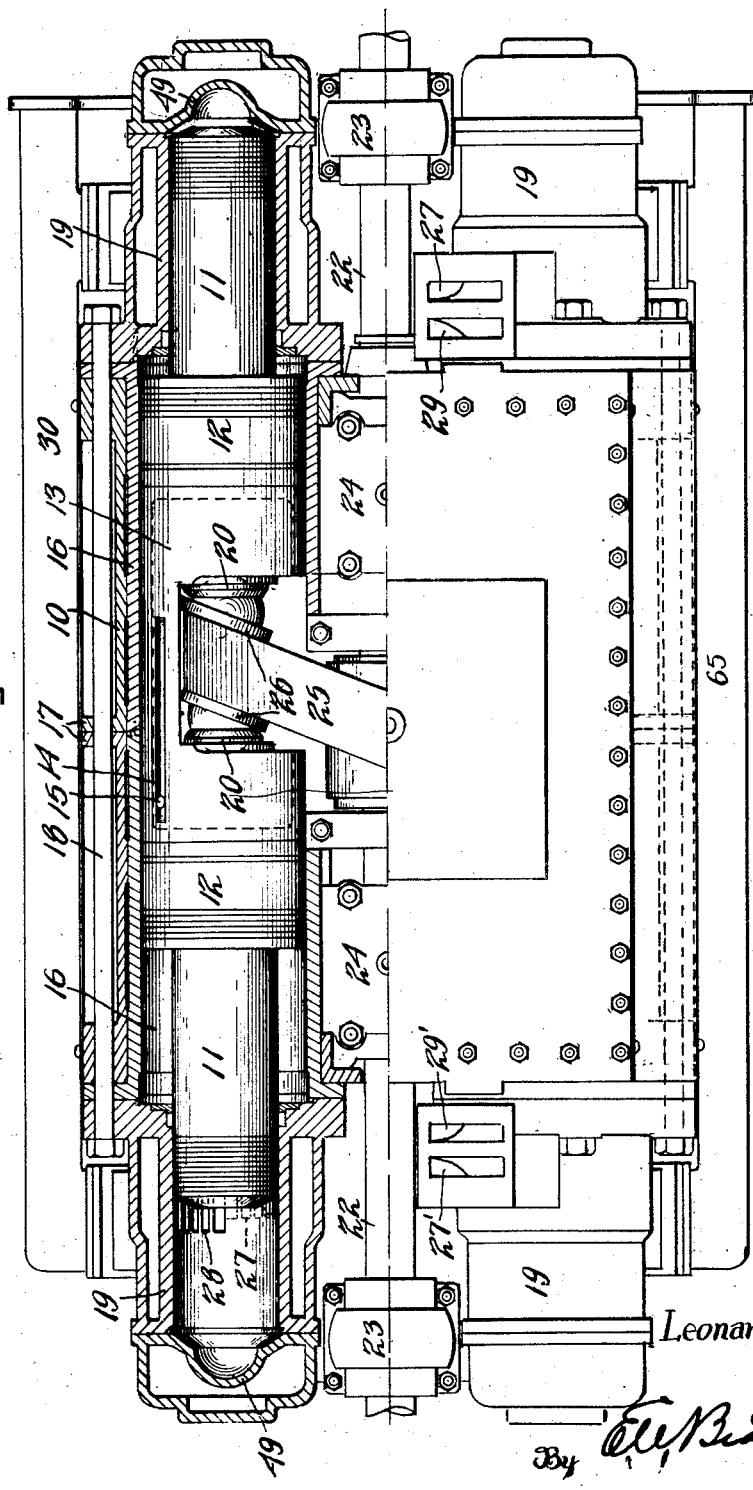
Inventor
Leonard B. Harris
By
Attorney May 22, 1928. 1,670,355
L. B. HARRIS
INTERNAL COMBUSTION ENGINE
Filed March 6, 1926 7 Sheets-Sheet 6
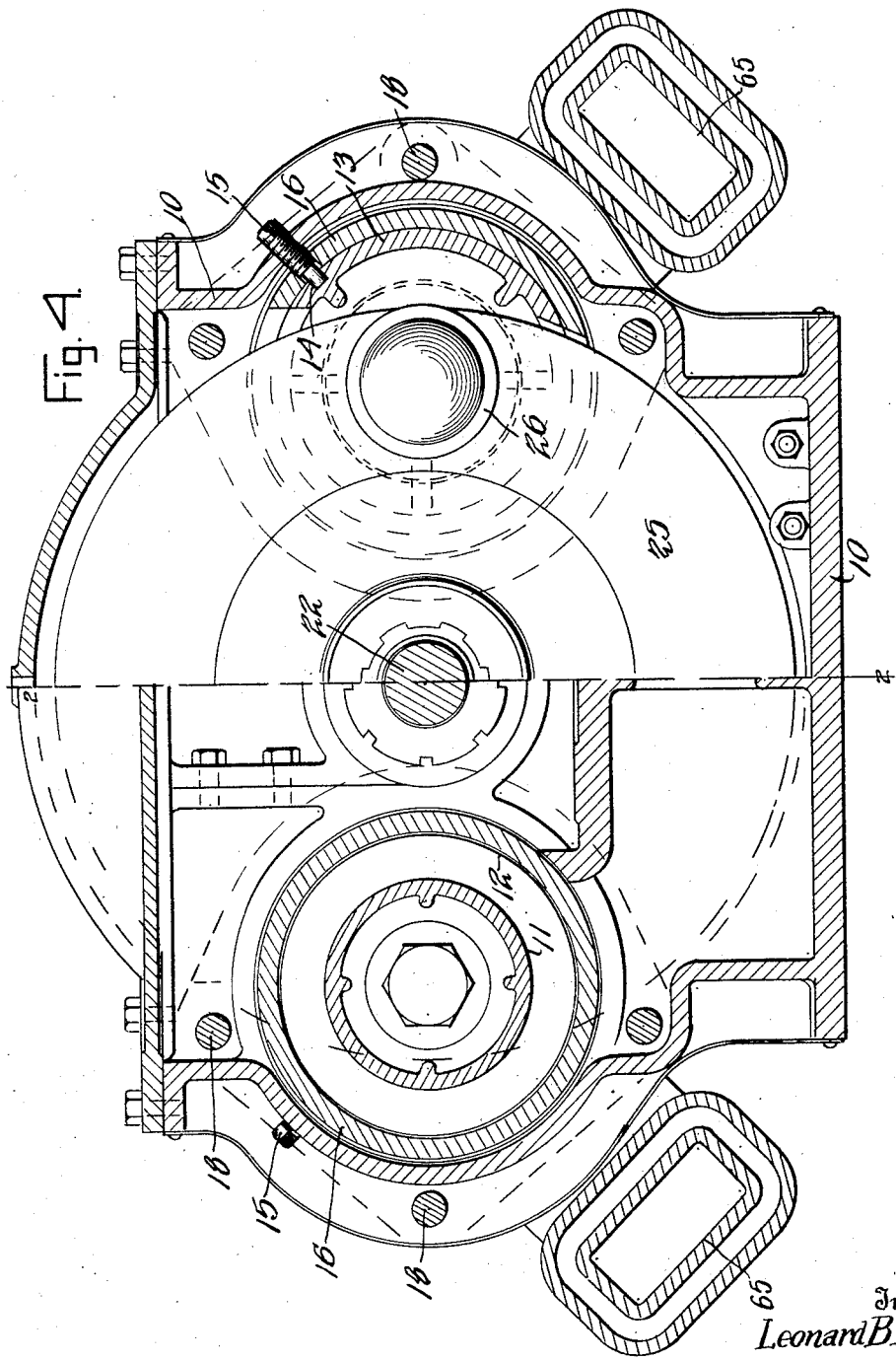
Inventor
Leonard B. Harris
By [signature]
Attorney

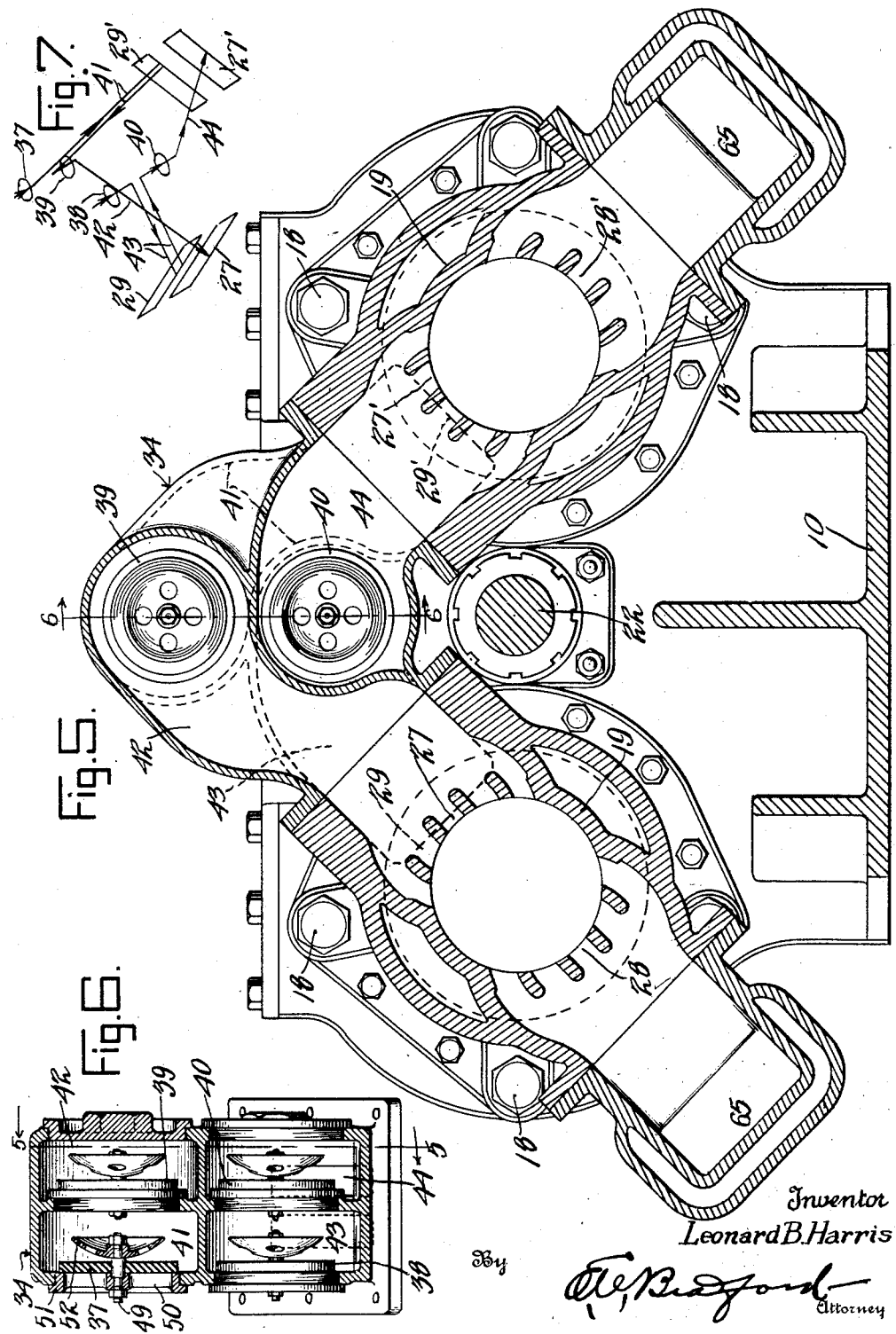

Patented May 22, 1928.

1,670,355

UNITED STATES PATENT OFFICE.

LEONARD B. HARRIS, OF NEW YORK, N. Y.

INTERNAL-COMBUSTION ENGINE.

Application filed March 6, 1926. Serial No. 92,871.

My said invention relates to internal combustion engines and it is an object thereof to provide an engine of the Diesel type in which a plurality of pistons act on an oblique disk or so-called wabble plate.

A further object of the invention is to provide an improved piston construction for use with alined cylinders.

Another object is to provide an improved lubrication system for such engines. These and other objects will be more fully defined hereinafter.

Referring to the accompanying drawings which are made a part hereof and on which similar reference characters indicate similar parts, Figures 1ª and 1ᵇ, taken together, constitute a side elevation of the engine.

Figures 2ª and 2ᵇ, taken together, a similar view partly in vertical central section on line 2—2 of Fig. 4, with parts omitted, Figure 3, a plan with parts removed partly in section to show the internal construction, Figure 4, a vertical section on two different planes in Figure 2ª, Figure 5, a section on line 5—5 of Fig. 6, Figure 6, a section on line 6—6 of Fig. 5, and Figure 7, a diagrammatic view illustrating the movements of air in the operation of the engine.

In the drawings reference character 10 indicates the supporting frame or casing of my device which frame may be of any conventional or desirable character. A plurality of sets of pistons are supported on this frame by suitable cylinders, each piston comprising a reduced portion 11, which serves as a working piston, and a larger portion 12, which serves as a scavenger piston, the whole forming a stepped piston. A pair of such alined stepped pistons are connected by a yoke 13 U-shaped in side elevation, said yoke being bolted to the adjacent ends of the pistons or otherwise suitably secured thereto. Each of the yokes has a slot indicated at 14 in which a stud 15 engages to prevent rotation of the yoke about its axis. The stud is held in a threaded aperture in the outer shell 10 of the engine and extends through a hole in the wall of the cylinder 16. Said hole may be threaded if desired. The shell or casing 10 is preferably formed of two parts joined about mid-length of the engine by abutting flanges 17 secured together by means of bolts 17'. The bolts or tie rods 18 tie together the end cylinders 19 (in which the reduced ends 11 of the pistons have their movement) and the intermediate cylinders 16 (in which the scavenger pistons 12 have their movement) thus taking care of the torsional strain due to simultaneous explosions in cylinders at opposite corners of the engine. The larger portions 12 of the pistons operate as scavenger pistons in portions 16 of the cylinders while the smaller portions 11 of the pistons operate as working pistons in the portions 19 of the cylinders, as will be readily understood.

Adjustable plugs 20 are provided in the adjacent ends of their enlarged parts 12 and are held in place by screw-threads or other appropriate adjusting means. Said plugs are hollowed out at their inner ends to form cup-shaped recesses. Longitudinal grooves are provided at 21 about the periphery of the plug 20 to permit engagement by a spanner for purposes of adjustment. The main shaft 22 of the engine (Fig. 2ᵇ) which is supported in the frame in any suitable manner, as by means of plain bearings 23 and Kingsbury thrust bearings 24 (details of which are not shown), bears a wobble plate or oblique disk 25 which is intended to be driven by the pistons heretofore described. The connection between the pistons and the wabble plate is formed by means of a series of slippers 26 at each side of the wabble plate. Each of these slippers comprises a disk with a flat face bearing against the flat face of the wabble plate and a hemi-spherical boss for engagement with the cup-shaped recess in the outer end of the adjustable plug 20 of the corresponding piston.

It has heretofore been proposed to utilize a slipper in like connection but in previous constructions means have been provided by means of which the slipper was held against rotation upon its own axis. In my construction each slipper is left free to rotate and hence a point on its surfaces will have a sort of gyratory path on the adjacent face of the wabble plate due to the combined rotary movement of the wabble plate and the slipper about their respective axes. This conduces to effective lubrication, by any suitable or approved means, of the contacting faces of the two parts and equalizes the wear over the entire face of the slipper so as to make its contact with the wabble plate always the same.

My engine embodies means for compressing air in the power or working cylinder 19 for the purpose of igniting a charge of liquid fuel forced into the highly compressed air so as to be ignited by the heat engendered by the compression of such air, as is well understood by those familiar with the so-called Diesel type of engine. For introducing air into said working cylinders in sufficient quantity to scavenge the gases due to combustion of the previous charge and also to provide pure air for use in connection with the new charge of fuel I have provided novel means consisting of passages leading from the scavenging chambers 16 of the cylinders to the working chambers 19 with appropriate inlets to the scavenging chambers and outlets from the working chambers. Such passages are best shown in Figures 2$^b$, 5, 6 and 7. The working chambers have inlet ports 27, 27' (Figs. 3 and 5) and outlet ports 28, 28'.

As the piston shown at the top of Fig. 3 which is the piston in the cylinder at the left hand side of Fig. 5, moves to the left air is compressed in the scavenging chamber 16 of the left hand cylinder and is forced out through passages indicated in part at 44 (Fig. 5) to inlet ports 27' in the working chamber at the lower left hand corner in Figure 3 where the compressed pure air acts to force out the products of combustion and thereafter to fill that working chamber with pure air.

The advance of the piston shown in Fig. 3 closes first the inlet port 27, then closes the outlet port 28, and then compresses the air into the small space at the end of the cylinder inside the boss 49. At this time a jet of liquid fuel is injected into this space and simultaneously into the working chamber 19 at the lower right hand corner by means of the fuel pumps 60 as shown in Fig. 1$^a$ and due to the heat of the compressed air the fuel is immediately ignited so as to force the one piston to the right and the other to the left whereupon the larger stepped portion at the other end of the upper piston in Fig. 3 in turn forces air into the working chamber at the lower right hand corner of Fig. 3 which contains the reduced portion of the parallel piston the cylinder shown at the bottom of Fig. 3, or at the right in Fig. 5, thus scavenging the chamber and thereafter replenishing the air supply therein. As the piston shown in Fig. 3 moved to the right (or into the position shown in said figure) the air in the lower left hand working chamber 19 (Fig. 3) was compressed by movement of the corresponding piston to the left and simultaneously air from the scavenging chamber was forced into the working chamber 19 at the upper left hand corner. Thereafter fuel is supplied to the working chambers at the lower left hand and upper right hand in Fig. 3, and thus the alternate pressure from opposite sides continues the rotation of the wabble plate and the shaft driven thereby. From the exhaust port 28 the gases pass out through passages 65 which are water jacketed.

The device of my invention is provided with pneumatically operated starting means indicated generally at 55 in Fig. 1$^a$, which figure also shows eccentrics 33 for operating said air starting mechanism 55 and shows the valve casing 34 for controlling the passage of air from either of the scavenging chambers to the opposite working chamber, as previously explained.

A governor 35 is shown in Fig. 1$^b$ as is also a controlling hand-wheel 36. The valve casing 34, shown more particualrly in Figs. 5 and 6, contains a set of valves 37, 38, 39, 40 which serve to control passages leading respectively from the outer air to the scavenging chambers of the respective cylinders at the left-hand end of Fig. 1$^a$ and from the respective scavenging chambers to the working chambers of the opposite cylinder in cases where, as here, there are but two cylinders, it being obvious that the number of casings 34 must increase as the number of cylinders increases. For example, the valve 37 closes the external port of a passage indicated in dotted lines at 41 leading to the scavenging chamber of the piston at the right-hand side of Fig. 5 while the valve 39 closes a passage 42 leading from such chamber to the working chamber of the left-hand cylinder as shown in Fig. 5. The valve 38 closes an external port of a passage 43 leading from the outer air to the scavenging chamber of the left-hand cylinder and the valve 40 closes a passage 44 leading from said chamber to the working chamber at the lower left hand corner of Fig. 3.

A diagrammatic illustration showing the path of the air through the different passages is provided in Fig. 7. In this illustration the circles denote the respective valves 37, 38, 39 and 40. A movement of the right-hand piston (Fig. 5) to the right draws the air along the line of the arrows through valve 37, passage 41 and port 29' into the scavenging chamber of the corresponding cylinder which is at the lower left hand in Fig. 3. On the return movement of the piston the air passes back by way of the same passage 41 but the valve 37 is now closed by the air current and the valve 39 is opened so that the air passes through the passage 42 and port 27 to the working chamber indicated at the upper left hand corner in Fig. 3 of the left-hand cylinder (Fig. 5) producing a scavenging action and then filling this chamber with air to be compressed, as above explained, in the charge-forming operation.

A movement of the left-hand piston (Fig. 5) draws a charge of air through valve 38, passage 43, and port 29 into the scavenging chamber at the upper left hand corner in Fig. 3. The opposite movement of the piston forces the air back through port 29 and passage 43, then through valve 40, passage 44 and port 27' to the working chamber at the lower left hand in Fig. 3, the piston of which has at this time uncovered port 27' and the exhaust port 28'. It will be recalled that the pistons at each side of the axis of the engine move oppositely so that each stepped piston acts as a scavenging agent for the oppositely working piston at the same end of the engine.

It will be understood that the valves are actually possessed of considerable flexibility and preferably are rather thin. These valves are located on spindles 49 passing through the hubs of spiders 50 which in a preferred form of the invention have six arms extending out to the rim 51 of the thimble which closes the valve opening and supports the valve. Each of the spindles supports a shield 52 at a little distance from the valve so that the valve may slide inward and then bend so as to lie against the curved outer face of the shield. It will be evident that the air drawn in through a valve, as 37 or 38, cannot return through the same passage for the reason that the valve is carried into closing position by the flow of air so as to prevent exit of air through the inlet passage. At the same time the valve located in alined relation in Fig. 6 will be forced open by the pressure of the air so as to permit the exit from the scavenging chamber of one cylinder to the working chamber of the adjacent parallel cylinder.

Having thus fully described my said invention, what I claim as new and desire to secure by Letters Patent, is:

1. An internal combustion engine comprising a pair of parallel cylinders, a stepped piston in each cylinder, main air passages leading from the atmosphere to the scavenging chambers of the respective cylinders, branch passages connecting each of said passages to the working chamber of the adjacent parallel cylinder, floating valves at the entrance to said main air passages, and floating valves at the junction of the main and the branch air passages, substantially as set forth.

2. In an internal combustion engine comprising pairs of opposed stepped cylinders having aligned stepped pistons therein, a yoke connecting the opposed pistons therein, a wabble plate operating within said yoke, and slippers carried by said yoke the slippers operating against opposite sides of said wabble plate, substantially as set forth.

3. In an internal combustion engine comprising pairs of opposed stepped cylinders having aligned stepped pistons therein, a yoke connecting the opposed pistons therein, a wabble plate operating within said yoke, adjustable blocks carried by said yoke, and slippers mounted in said blocks said slippers operating against opposite sides of said wabble plate, substantially as set forth.

4. In an internal combustion engine comprising pairs of opposed stepped cylinders having aligned stepped pistons therein, a yoke connecting the opposed pistons therein, a wabble plate operating within said yoke, adjustable blocks carried by said yoke, and slippers mounted to revolve in said blocks said slippers operating against opposite sides of said wabble plate, substantially as set forth.

5. In an internal combustion engine comprising pairs of opposed stepped cylinders having aligned stepped pistons therein, a U-shaped yoke connecting the opposed pistons therein, means to prevent rotating of said yoke and pistons, a wabble plate operating within said yoke, adjustable blocks carried by said yoke said blocks having ball sockets, and rotatable slippers mounted in said blocks each of said slippers comprising a ball fitting in a ball socket and a disk face adapted to operate against said wabble plate, substantially as set forth.

6. In an internal combustion engine comprising pairs of opposed stepped cylinders having aligned stepped pistons therein, a U-shaped yoke connecting the opposed pistons therein, means to prevent rotation of said yoke and pistons, a wabble plate operating within said yoke, adjustable blocks carried by said yoke with their axis in line with the axis of said cylinders said block having ball sockets, and rotatable slippers mounted in said blocks each of said slippers comprising a ball fitting in a ball socket and a disk face adapted to operate against said wabble plate, substantially as set forth.

7. In an internal combustion engine comprising pairs of opposed stepped cylinders having aligned stepped pistons therein, a U-shaped yoke connecting the opposed pistons therein, means to prevent rotation of said yoke and pistons, a wabble plate operating within said yoke, adjustable blocks carried by said yoke with their axis in line with the axis of said cylinders said blocks having ball sockets, and rotatable slippers mounted in said blocks said slippers comprising a ball fitting in a ball socket and a disk face adapted to rotate against said wabble plate, substantially as set forth.

In witness whereof, I have hereunto set my hand at New York, New York, this 13th day of February, A. D. nineteen hundred and twenty-six.

LEONARD B. HARRIS.